W. C. BAKER.
Car-Brakes

No. 149,283.  Patented April 7, 1874.

Witnesses  
Chas. H. Smith  
Harold Serrell

Inventor  
William C. Baker  
per Lemuel W. Serrell  
atty

UNITED STATES PATENT OFFICE.

WILLIAM C. BAKER, OF NEW YORK, N. Y.

IMPROVEMENT IN CAR-BRAKES.

Specification forming part of Letters Patent No. 149,283, dated April 7, 1874; application filed January 13, 1874.

*To all whom it may concern:*

Be it known that I, WILLIAM C. BAKER, of the city and State of New York, have invented an Improvement in Car-Brakes, of which the following is a specification:

Before my invention car-brakes had been actuated by atmospheric pressure acting upon pistons or bellows-cylinders, both by compression and exhaustion.

The object of my invention is to render the action of the brake more rigid than that derived from the atmosphere by the intervention of a liquid between the actuating fluid and the brake-connections, so that the pressure will be exerted with great regularity along the entire train, and the brakes will be relieved with sufficient rapidity, but not so suddenly as to shake the car.

I make use of elastic or flexible diaphragms contiguous to the head or heads that move the brake-connections. A second vessel and diaphragm are employed, connected to the vessel containing aforesaid diaphragm by a pipe, and the spaces are filled with a liquid; (it is preferable to employ a saturated solution of salt and water, so as to prevent the liquid freezing; (and from this space the pipe and the connected vessels being filled with the liquid.

One or more pipes extending from one car to the other is employed, and it is in communication with the said vessel, and the air or steam supplied through such pipe, pressing upon such diaphragm, forces the water or liquid into the space between the brake-operating diaphragm or diaphragms, and moves the brakes.

Figure 2:
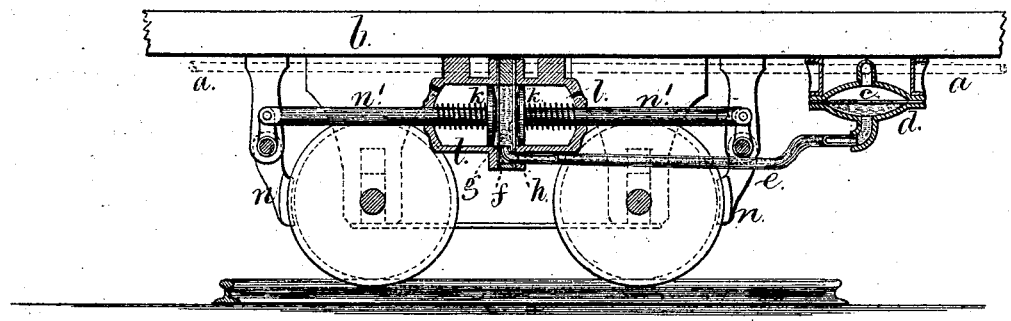
Figure 1:
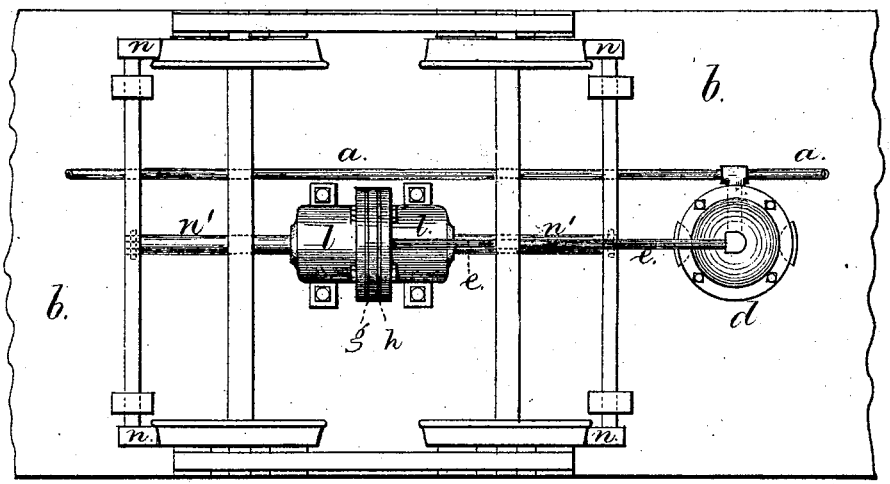

In the drawing, Figure 1 is an inverted plan of the car-bottom and brake mechanism, and Fig. 2 is a section through the respective diaphragms.

The pipe $a$ is provided with couplings at the ends of the car or platform $b$, and this pipe is connected with the vessel $d$ above the elastic diaphragm $c$; and from said vessel $d$ a pipe, $e$, leads to the space $f$ between the elastic diaphragms $g$ $h$. The moving heads $k$ are guided in the cylinder $l$, or in slides, and are connected, by rods or levers $n'$, with the cross-bars or brake-blocks $n$. The arrangements of the connections between the heads $k$ and brake-blocks $n$ will vary according to the character of truck employed. In the drawing single pairs of wheels are represented. At the locomotive it is preferable to employ an air-vessel, and admit steam directly into the same, so as to produce the required pressure along the train, by the connected pipes $a$, so as to avoid the condensation that would ensue if the steam passed along the train, the air being displaced out of such vessel by the steam. The pressure of fluid in the pipe $a$ acts upon the diaphragm $c$, to force a portion of the liquid from the vessel $d$, through the pipe $e$, to the space between the diaphragms $g$ $h$, and give motion to them and to the brakes. In consequence of the time consumed in forcing the liquid through the pipe $e$, there is opportunity for the pressure to equalize itself throughout the train, and all the brakes to be applied uniformly, and the liquid, not being elastic, exerts a more rigid or positive pressure than air, because the pipe $e$ is not large enough to allow of the sudden movement of the liquid; hence the pressure attained by the use of a liquid intervening between the brake mechanism and the fluid is more available for car-brakes than atmospheric air. The non-freezing liquid may be employed in cylinders with pistons instead of employing diaphragms. There may be two diaphragms or pistons opposite to each other, as shown; or but one diaphragm or piston may be used with the brake-connection.

I am aware that a liquid has been employed to actuate car-brakes; but the cylinders containing the brake-actuating pistons were open to the direct action of liquid forced through the pipe running lengthwise of the train.

By my arrangement, the diaphragm $c$ in the vessel $d$ is applied on each car and confines the water, and the pressure on each diaphragm is transferred to the diaphragms $g$ $h$ through the pipe $e$.

I claim as my invention—

The vessel $d$, applied to each car, and containing the diaphragm $c$, and connected by the pipe $e$ to the cylinder containing the brake-actuating diaphragm, in combination with a pipe passing the length of the train, and conveying the fluid under pressure to the vessels $d$, as set forth.

Signed by me this 10th day of January, A. D. 1874.

W. C. BAKER.

Witnesses:
GEO. T. PINCKNEY,
CHAS. H. SMITH.